United States Patent [19]

Butcher et al.

[11] Patent Number: 4,802,420

[45] Date of Patent: Feb. 7, 1989

[54] CENTRE BEAM RAILROAD CAR

[75] Inventors: Ronald S. Butcher; Mohamed A. Khattab, both of Burlington, Canada

[73] Assignee: National Steel Car Limited, Hamilton, Canada

[21] Appl. No.: 76,176

[22] Filed: Jul. 21, 1987

[51] Int. Cl.⁴ .............................................. B61D 17/00
[52] U.S. Cl. .................... 105/355; 105/404; 105/407; 105/416; 105/419
[58] Field of Search ............... 105/355, 396, 411, 413, 105/414, 416, 418, 419, 407, 404; 296/210; 52/637, 638, 648, 693, 694

[56] References Cited

U.S. PATENT DOCUMENTS

| 3,244,120 | 4/1966 | Taylor | 105/414 |
| 3,675,592 | 7/1972 | Bateson et al. | 105/414 X |
| 3,734,031 | 5/1973 | Wagner | 105/404 X |
| 3,820,476 | 6/1974 | Harter et al. | 105/404 |
| 4,543,887 | 10/1985 | Baker | 105/355 |
| 4,681,041 | 7/1987 | Harris et al. | 105/355 |

Primary Examiner—Leonard E. Smith
Attorney, Agent, or Firm—Ridout & Maybee

[57] ABSTRACT

This invention relates to centre beam freight cars. The purpose of these freight cars is to carry large, bulky freight which does not require much protection from the elements. Thus, any freight car must have wide utility and sufficient rigidity but a tare mass which does not constitute a high proportion of the fully laden mass of the freight car. The prior art freight cars suffer from a high tare mass proportion in order to provide sufficient rigidity. In this invention, a freight car is provided with a centre beam structure in the form of a vertical truss having a horizontal truss mounted on the top of it. Either of the trusses, or both, are in the form of an open truss. This centre beam structure provides a freight car which has adequate resistance to normal lateral and compressive stresses but has a relatively low tare mass in relation to its fully laden mass.

8 Claims, 5 Drawing Sheets

CENTRE BEAM RAILROAD CAR

FIELD OF THE INVENTION

The invention relates to centre beam freight cars.

BACKGROUND TO THE INVENTION

Centre beam freight cars are freight cars in which a beam structure is located centrally, and longitudinally, in the freight car above the load carrying platform. The end of the beam are anchored in the end bulkheads of the car. The beam serves as a sink for stresses transferred from a further beam structure which is located below the load carrying platform.

Centre beam freight cars are used primarily to transport large packages or bundles which do not require much protection from the elements. Therefore, a freight car should have wide utility but need not have much covering for freight to be transported. Also, the tare mass of the empty car should not constitute a high proportion of the mass of a fully laden car.

Early freight cars required considerable mass in the central beam structure located below the load carrying platform in order to accommodate safely lateral and compressive stresses. Taylor, in U.S. Pat. No. 3,244,120 describes a freight car in which this considerable mass is much reduced. This freight car is a flat car type of railroad car which has a longitudinally extending, composite beam comprising a load carrying composite stem and cross members forming the floor of the freight car. A beam extends upward from each end of the composite stem. A compression member connects the upper ends of the upwardly projecting beams. The compression member spans the freight car at the same height as the top of the freight car bulkheads. The composite stem, upwardly extending beams and compression member form what is now referred to as the centre beam. Further reduction of the tare mass in proportion to the laden car mass is not safe with this structure as such a freight car could not accommodate safely the lateral forces which may arise in normal use.

This problem was partially overcome by Wagner in U.S. Pat. No. 3,734,031 and in the corresponding Canadian Pat. No. 939,197. In these patents, a centre beam freight car is described which has a central supporting structure comprising a vertical plate having a top compression structure. The vertical plate has a number of beams extending vertically upward on either side of it to provide additional support. The top compression structure is, in essence, a horizontal metal plate joined centrally to the vertical plate and has horizontal stiffening members joined to both edges of the horizontal plate. The horizontal plate and stiffening members form a trough like structure which may be used to store "tie-down" equipment such as ropes and the like. However, the primary utility of the top structure is to provide resistance to lateral stresses which arise during use of the car; in other words, to prevent snaking.

However, the tare mass of Wagner's freight car still constitutes a high proportion of the mass of a fully laden car. Furthermore, snow and the like can collect in the trough-like structure and adjacent the vertical plate. This may cause difficulty in retrieving or attaching any "tie-down" equipment.

Accordingly, it is an object of this invention to provide a centre beam freight car which is adequately protected against lateral and compressive stresses which may arise in normal use and which has a tare mass which constitutes at least a lower proportion of the fully laden mass than prior art centre beam freight cars.

SUMMARY OF THE INVENTION

According to one aspect of the invention there is provided a freight car of the bulkhead flat car type having a centre beam structure extending between a pair of end bulkheads and supporting substantially the entire load carried by the freight car, the centre beam structure comprising a vertical spine extending for the length of the centre beam structure, and crossbearers forming a load-carrying surface; the vertical spine connecting to a compression member in the form of an open truss extending in a substantially horizontal plane, and aligned centrally about the vertical spine and extending the length thereof, the compression member absorbing compressive and lateral stresses transferred to the spine in use.

According to another aspect of the invention, there is provided a freight car of the bulkhead flat car type having a centre beam structure extending between a pair of end bulkheads and supporting substantially the entire load carried by the freight car, the centre beam structure comprising a vertical open truss extending for the length of the centre beam structure, and crossbearers forming a load-carrying surface; the vertical open truss connecting to a compression member extending in a substantially horizontal plane and aligned centrally about the vertical open truss and extending the length thereof, the compression member absorbing compressive and lateral stresses transferred to the centre beam structure in use.

The compression member is mounted to extend along the top of the vertical spine, and comprises a rail member aligned on top of the vertical spine and extending the length of the compression member; a number of spaced apart, cross-members each secured at its midportion to the rail member and extending laterally therefrom; two edge rail member extending the length of the compression member, one on each side of the rail member, and joining the ends of the cross-members; and a diagonal cross-members extending between each pair of adjacent cross-members.

BRIEF DESCRIPTION OF THE DRAWINGS

One embodiment of the invention is described, by way of example only, with reference to the following drawings in which.

DETAILED DESCRIPTION OF THE DRAWINGS

Figure 1:
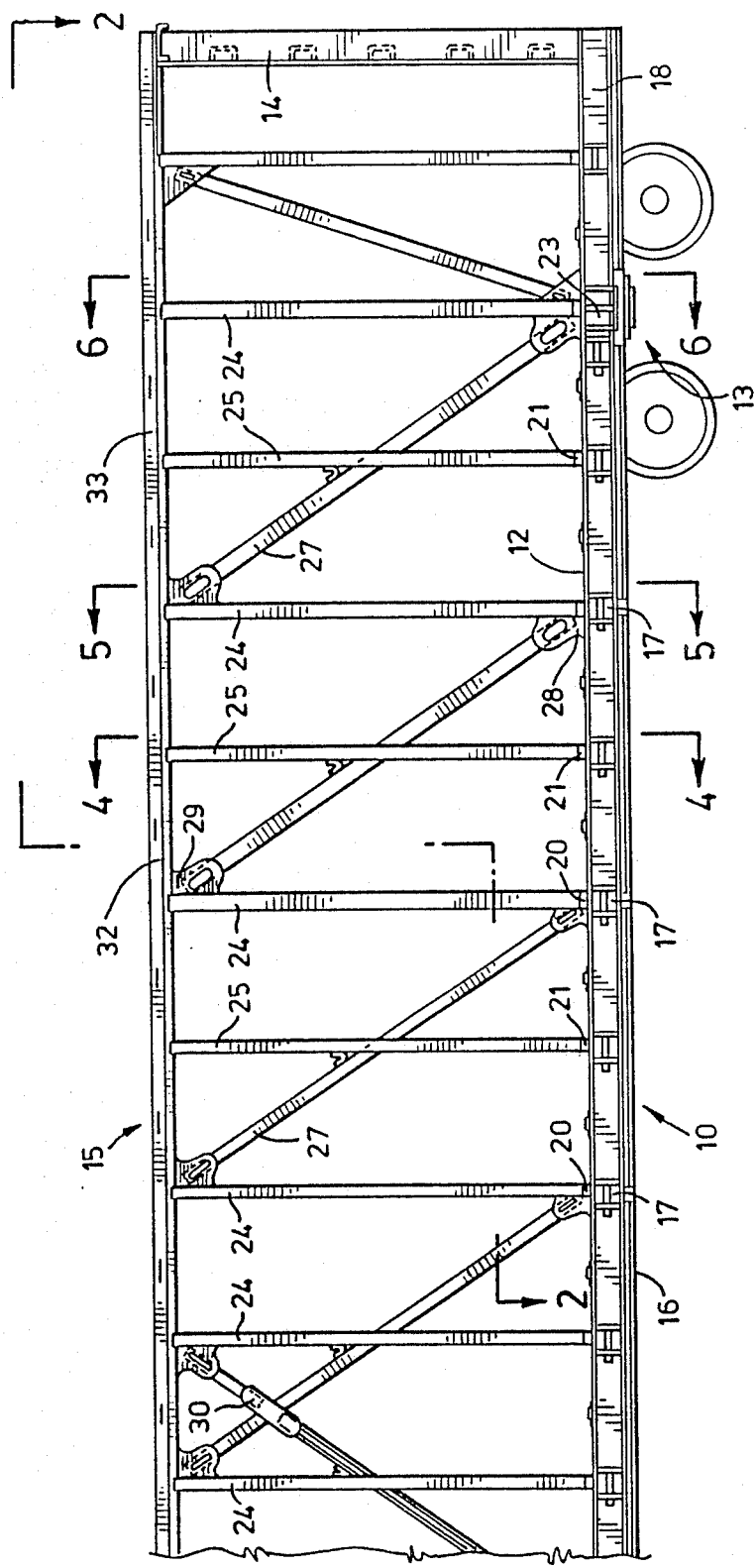
FIG. 1 is an elevational view of one-half of a freight car.

Referring to FIG. 1, there is provided a freight car of the bulkhead flat car type, generally indicated by the numeral (10). Only just over one-half of the freight car is shown, the other half being substantially identical. The freight car has a floor structure (12) mounted on conventional wheel trucks, generally indicated by the numeral (13), adjacent each end. A bulkhead (14) is provided at each end of the freight car. A centre beam structure, in the form of an open truss and generally indicated by the numeral (15), extends between the bulkheads along the longitudinal or central axis of the car. Furthermore, the centre beam structure (15) extends upward, substantially vertically, to a height equal to that of the bulkhead.

The centre beam structure (15) is supported on a sill (16) which extends the length of the freight car along the longitudinal axis thereof. The sill (16) comprises a box-sectioned member of substantially rectangular cross-section. suitable plate members may be used to manufacture the centre sill (16). However, channel or rail members may also be used. Extending laterally from each side of the centre sill (16) are crossbearers (17), better illustrated in FIG. 5. A channel member (18), normally known as a side sill, is located at the free end of each crossbearer (17) with the open side of the channel member facing outward. A floor panel (19) is mounted on each side of the car on the crossbearers (18) and the side sill (18). The floor panels cover the length of the freight car. A plurality of tapered sleepers (20) (or risers) are mounted on each crossbearer (17) and side sill (18) and each extend laterally from the centre sill (16) to the side cell (18). The tapering of the sleepers is such that each sleeper is higher above the side sill (18) than above the centre sill (16). Therefore, a load placed in the freight car is subject to a tilt toward the centre beam structure (15). A composite sleeper (21) is mounted to the centre sill (16) and side sill (18) between each two crossbearers (17). The composite sleeper (21) extends laterally between the centre sill (16) and the side sill (18). A suitable gusset (22), better illustrated in FIG. 4, may be provided to secure the composite sleeper (21) firmly to the side sill (17) A pair of bolstering cross-members (23) extend laterally from the centre sill (16) adjacent to, but remote from, either end of the freight car. Each member of a pair extends from an opposite side of the centre sill (16). The bolstering cross-members (23) provide additional support for the wheeled trucks (13).

The centre beam structure (15), which forms the spine of the freight car, is mounted on and includes the centre sill (16). At a position adjacent to which each pair of crossbearers (17) joins the centre sill (16), a supporting member (24) extends upward, substantially vertically, from the sill (16). The vertical supporting members (24) are substantially I-shaped in cross-section, where the stem of the I runs normally to the longitudinal axis of the freight car. The vertical supporting members (24) are tapered such that the stem of the I is longer adjacent the bottom of the member than adjacent the top. This is better illustrated in FIG. 5. This tapering, in combination with the tapering of the sleepers (20), provides for any load carried in the freight car to be tiled toward the centre beam. The angle between the tapered sleepers (20) and supporting member (24) is substantially a right angle. Each vertical supporting member (24) may be formed from a wide flanged I beam by cutting through the web of the I at an angle to the axis. Such a cut forms two T-shaped members. Turning one of the T-shaped members upside down and then welding the members together creates the tapered I-shaped member (24). A vertical supporting member (24) also extends upward from the sill adjacent to the position where a pair of bolstering members (23) connects to the sill (16).

A vertical bracing member (25) extends upward from the centre sill (16) between two vertical supporting members (24). The vertical bracing members (25) are channel-shaped in cross-section and are tapered similarly to the vertical supporting members (24). An aperture (26) is provided through the web of the channel in the middle region of the vertical bracing member (25). A diagonal bracing member (27) extends between each two vertical supporting members (24). One end of the diagonal bracing member (27) is attached, by means of a gusset (28), to the lower end of one vertical supporting member (24) while the other end of the diagonal bracing member (27) is attached, by means of a gusset (29), to the upper end of the other vertical supporting member (24). The diagonal bracing member (27) passes through the aperture (26) of the intermediate vertical bracing member (25). The upper end of any diagonal bracing member (27) is closer to the centre of the freight car than the lower end. Thus, the diagonal bracing members (27) in each half of the car will be pointing in substantially opposite directions. Also, two diagonal bracing members (27) are joined, by means of a brace (30) remote from their ends, about the centre line of the freight car. The two vertical supporting members (24) on either side of the centre line do not have a vertical bracing member between them.

Figure 2:
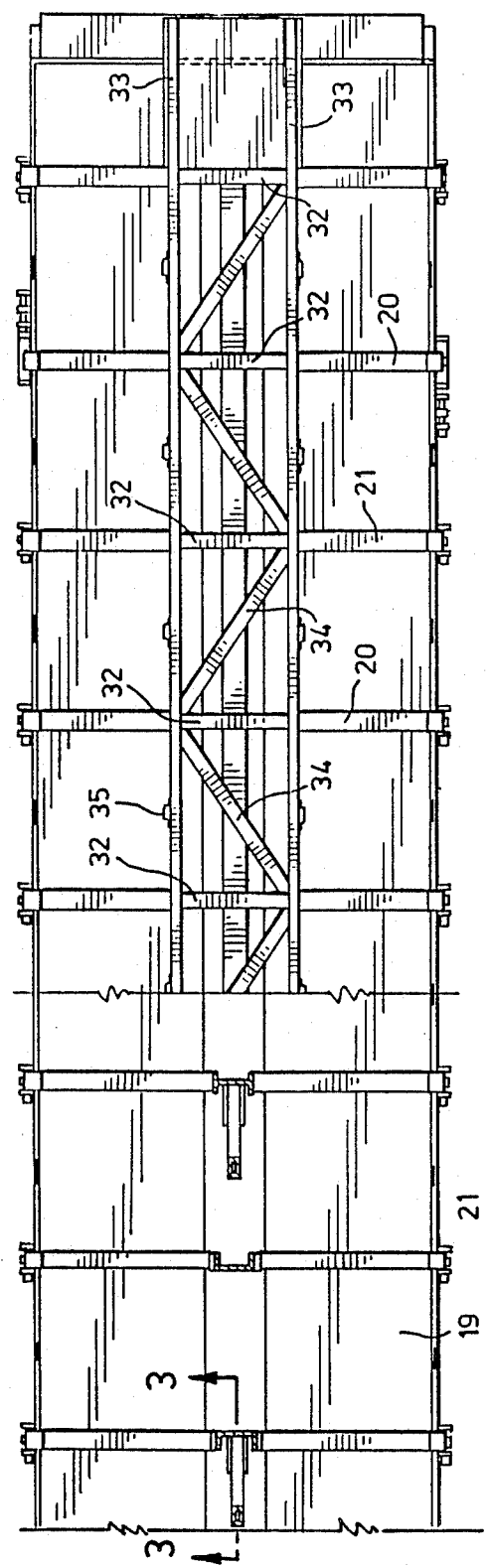
FIG. 2 is a part cross-sectional, part top view along line 2—2 in FIG. 1.
Figure 3:
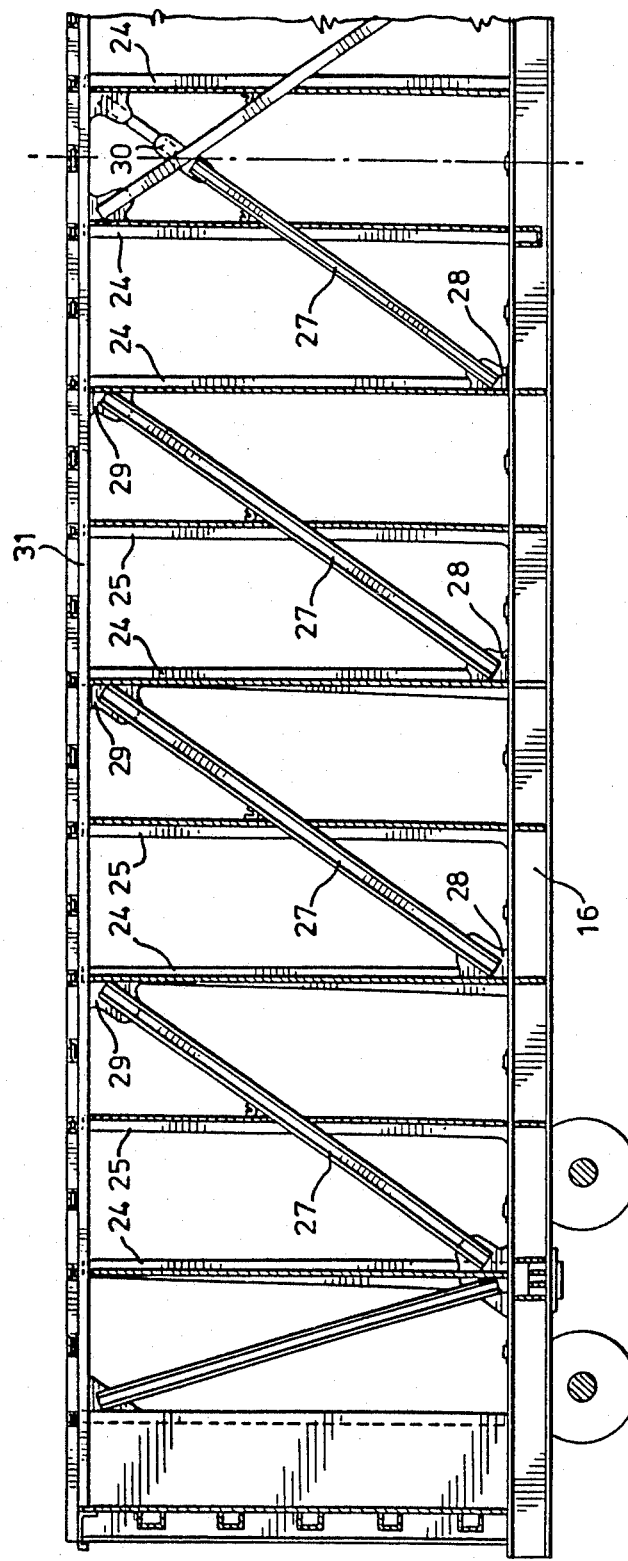
FIG. 3 is a sectional view taken along the central axis of the freight car along line 3—3 in FIG. 2 showing the other half of the freight car.
Figure 4:
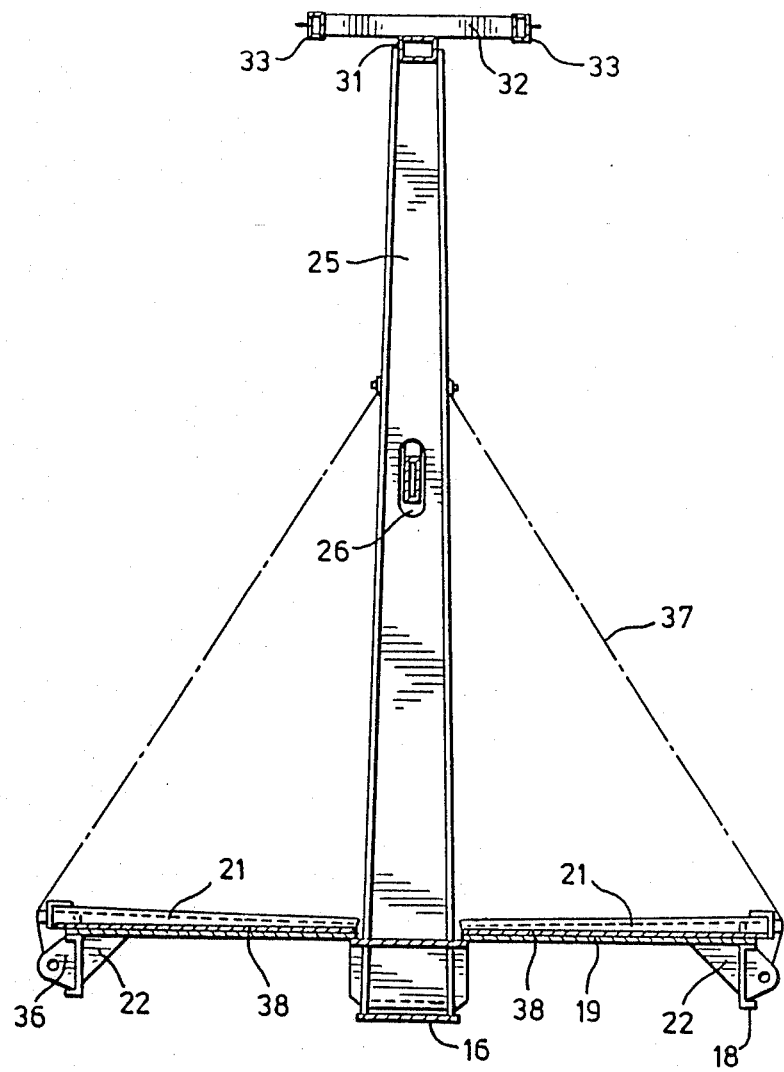
FIG. 4 is a cross-sectional view along line 4—4 in FIG. 1 showing the intersection of a vertical and a diagonal brace.
Figure 5:
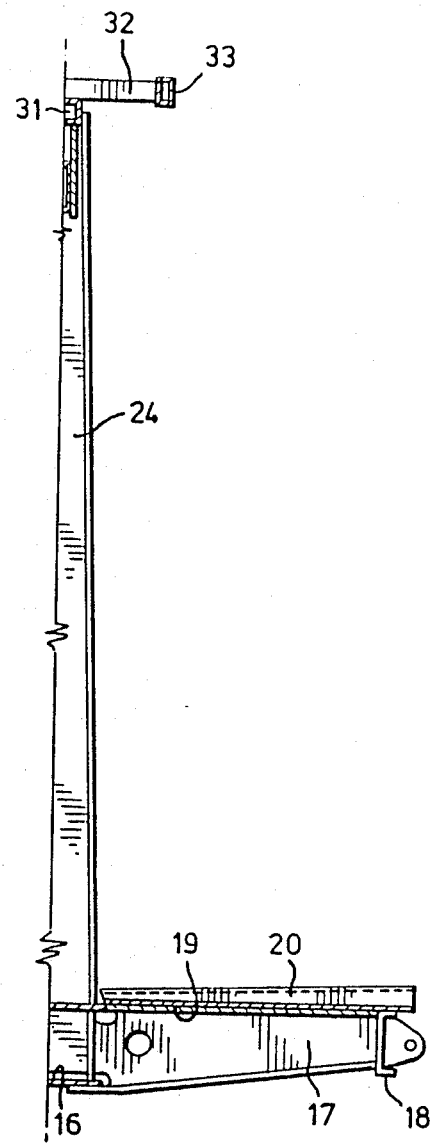
FIG. 5 is a half cross-sectional view taken along line 5—5 in FIG. 1 showing a brace.
Figure 6:
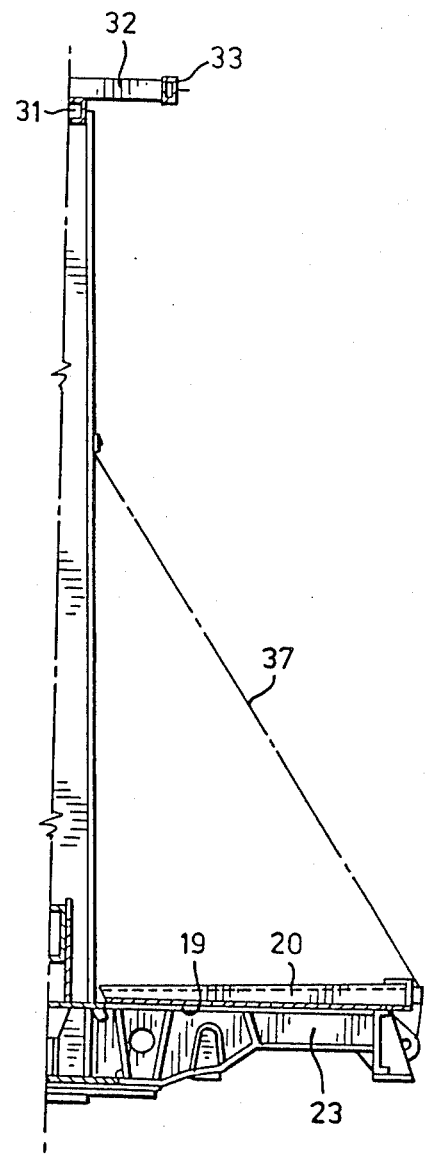
FIG. 6 is a half cross-sectional view taken along line 6—6 in FIG. 1 showing a bolster section.

A tubular rail member (31), shown in FIG. 4, extends substantially horizontally along the longitudinal axis of the freight car. This member serves to join the upper ends of the vertical supporting members (24) and the vertical bracing members (25) as well as the bulkheads (14). A number of spaced apart cross-members (32), shown in FIG. 2, are mounted on the tubular rail member (31) and extend laterally from either side thereof. An edge rail member (33) is located on either side of the centre beam and joins the free ends of the cross-members (32) and the bulkheads (14). A number of spaced apart diagonal cross-members (34) are located between the edge rail members. Each diagonal cross-member joins opposite ends of two adjacent cross-members (32). The rail member (31), the cross-members (32), the edge rail members (33) and the diagonal cross-members (34) form a horizontal truss structure. This horizontal truss structure constitutes a compression member which provides resistance to lateral stresses which may arise in use. Preferably, the compression member is mounted on the top of the spine of the centre beam structure (15) but it may be connected at a position lower than the top of the spine. Several anchors (35) are positioned along the edge rail members (33) to provide suitable means for tying down freight loaded in the freight car. Similarly, reels (36) are provided in the side sills (18) at the end of the floor panels. These reels may be conveniently used to store wiring (37) or the like which may be used to tie down freight in the freight car.

It is envisaged that a centre beam freight car as described will provide a lightweight yet stable means of transporting large bulky freight. The truss centre beam structure provides a spine having adequate resistance to compressive and lateral stresses which may arise in normal use. Furthermore the nature of the truss structure inhibits collection of water or snow in the freight car and hence overcomes a problem associated with the prior art freight cars. It is also envisaged that the freight car has a reduced tare mass to fully laden mass ratio.

Clearly, the exact spacing between vertical supporting members, vertical bracing members and horizontal cross-members, as well as the number of members used, depends on the size of the freight car as well as the intended application of the freight car. Similarly, the crossbearers and sleepers which project from the central sill may be spaced accordingly. These aspects, as well as the materials of construction will be clear to those skilled in the art.

It will be appreciated that numerous modifications may be made to the described embodiment without departing from the scope of the invention as laid out in the appended claims. For example, either the vertical spine or the compression member may be in the form of a known closed truss or a known closed composite beam, however these embodiments are envisaged to have higher tare masses than when both the spine and compression member are in the form of an open truss.

We claim:

1. A freight car of the bulkhead flat car type having a centre beam structure extending between a pair of end bulkheads and supporting substantially the entire load carried by the freight car, the centre beam structure comprising a substantially vertical spine, extending the length of the centre beam structure, and crossbearers forming a load-carrying surface; the vertical spine connecting to a compression member in the form of an open truss extending in a substantially horizontal plane and aligned centrally about the vertical spine and extending the length thereof, the compression member absorbing compressive and lateral stresses transferred to the spine in use, wherein the compression member is mounted to extend along the top end of the vertical spine and comprises a rail member aligned on top of the vertical spine and extending the length of the compression member; a number of spaced apart, cross-members each secured at its mid-portion to the rail member and extending laterally therefrom; two edge rail members extending the length of the compression member, one on each side of the rail member, and joining the ends of the cross-members; and a diagonal cross-member extending between each pair of adjacent cross-members.

2. A freight car according to claim 1 in which the vertical spine includes a sill attached to its lower end, where the sill extends for the length of the vertical member.

3. A freight car according to claim 3 in which the crossbearers forming the load carrying structure project laterally from either side of the sill.

4. A freight car of the bulkhead flat car type having a centre beam structure extending between a pair of end bulkheads and supporting substantially the entire load carried by the freight car, the centre beam structure comprising a vertical open truss extending for the length of the centre beam structure, and crossbearers forming a load-carrying surface; the vertical open truss connecting to a compression member in the form of an open truss extending in a substantially horizontal plane and aligned centrally about the vertical open truss and extending the length thereof, the compression member absorbing compressive and lateral stresses transferred to the centre beam structure in use, the compression member being mounted to extend along the top of the vertical open truss, and comprising a rail member aligned on top of the vertical truss and extending the length of the compression member; a number of spaced apart cross-members each secured at its mid-portion to the rail member and extending laterally therefrom; two edge rail members extending the length of the compression member, one on each side of the rail member, and joining the ends of the cross-members; and a diagonal cross-member extending between each pair of adjacent cross-members.

5. A freight car according to claim 4 in which the vertical open truss includes a sill attached to its lower end, where the sill extends for the length of the vertical truss.

6. A freight car according to claim 5 in which crossbearers forming the load carrying structure project laterally from either side of the sill.

7. A freight car according to claim 5 in which the vertical open truss is formed by a plurality of support members projecting vertically up from the sill, and a diagonal bracing member joining the upper end of one supporting member to the lower end of an adjacent supporting member.

8. A freight car according to claim 7 in which a vertical bracing member, having a central aperture, extends vertically upward from the sill between two support members, and said diagonal bracing member passing through the central aperture.

* * * * *